(12) United States Patent
Tasaki

(10) Patent No.: US 11,200,905 B2
(45) Date of Patent: Dec. 14, 2021

(54) INFORMATION PROCESSING METHOD AND INFORMATION PROCESSING DEVICE

(71) Applicant: Nissan Motor Co., Ltd., Yokohama (JP)

(72) Inventor: Masaru Tasaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/967,158

(22) PCT Filed: Feb. 6, 2018

(86) PCT No.: PCT/JP2018/004036
§ 371 (c)(1),
(2) Date: Aug. 4, 2020

(87) PCT Pub. No.: WO2019/155526
PCT Pub. Date: Aug. 15, 2019

(65) Prior Publication Data
US 2020/0365161 A1 Nov. 19, 2020

(51) Int. Cl.
*G10L 17/00* (2013.01)
*G10L 17/22* (2013.01)
(Continued)

(52) U.S. Cl.
CPC .......... *G10L 17/22* (2013.01); *G06F 16/9038* (2019.01); *G06F 16/90332* (2019.01);
(Continued)

(58) Field of Classification Search
CPC .... G06F 40/242; G06F 40/284; G06F 40/279; G06F 40/35; G10L 15/08;
(Continued)

(56) References Cited

U.S. PATENT DOCUMENTS 7,013,280 B2 * 3/2006 Davis .................. G10L 15/22
704/270
7,590,536 B2 * 9/2009 Bates .................. G10L 15/197
704/231
(Continued)

FOREIGN PATENT DOCUMENTS

CN 103780771 A 5/2014
CN 105872177 A 8/2016
(Continued)

OTHER PUBLICATIONS

J. Balcerek, S. Drgas, A. Dąbrowski and A. Konieczka, "Prototype multimedia database system for regislration of emergency situations," Signal Processing Algorithms, Architectures, Arrangements, and Applications SPA 2009, Poznan, Poland, 2009, pp. 144-148. (Year: 2009).*

*Primary Examiner* — Edgar X Guerra-Erazo
(74) *Attorney, Agent, or Firm* — Global IP Counselors, LLP

(57) ABSTRACT

A speech recognition unit converts speech uttered by a speaker to text data. An intention estimation unit extracts a nickname from the text data, and searches a database for registration information that satisfies a condition corresponding to the nickname. A search result output presents the searched for registration information to the speaker that corresponding to the nickname.

10 Claims, 6 Drawing Sheets

(51) Int. Cl.
  *G06F 16/903* (2019.01)
  *G06F 16/9038* (2019.01)
  *G06F 16/9032* (2019.01)
  *G10L 17/02* (2013.01)
  *G10L 17/06* (2013.01)
(52) U.S. Cl.
  CPC ........ *G06F 16/90335* (2019.01); *G10L 17/02* (2013.01); *G10L 17/06* (2013.01)
(58) Field of Classification Search
  CPC ......... G10L 2015/086; G10L 2015/088; G10L 15/1815; G10L 15/1822; G10L 15/222; G10L 2015/225; G10L 2015/223; G10L 15/00; G10L 2015/022; G10L 2015/025; G10L 2015/027; G10L 15/05
  See application file for complete search history.

(56) References Cited

U.S. PATENT DOCUMENTS

| | | | | |
|---|---|---|---|---|
| 8,015,196 | B2* | 9/2011 | Taranenko | G06F 16/29 707/758 |
| 8,374,862 | B2* | 2/2013 | Becking | G10L 15/26 704/235 |
| 8,744,995 | B1 | 6/2014 | Hewinson | |
| 10,241,644 | B2* | 3/2019 | Gruber | G06Q 10/1097 |
| 2003/0125869 | A1* | 7/2003 | Adams, Jr. | G01C 21/3679 701/532 |
| 2005/0192809 | A1* | 9/2005 | Dodrill | H04L 67/306 704/270.1 |
| 2007/0143100 | A1* | 6/2007 | Agapi | G06F 16/36 704/9 |
| 2008/0059172 | A1* | 3/2008 | Bocking | G10L 15/26 704/235 |
| 2008/0167871 | A1* | 7/2008 | Kim | G10L 15/22 704/246 |
| 2011/0022388 | A1 | 1/2011 | Wu et al. | |
| 2011/0213773 | A1* | 9/2011 | Kobayashi | H04N 21/47 707/736 |
| 2011/0288866 | A1 | 11/2011 | Rasmussen | |
| 2014/0324431 | A1* | 10/2014 | Teasley | G10L 15/22 704/246 |
| 2014/0324858 | A1* | 10/2014 | Kobayashi | H04N 21/4826 707/736 |
| 2016/0269524 | A1 | 9/2016 | Stottlemyer | |

FOREIGN PATENT DOCUMENTS

| | | |
|---|---|---|
| CN | 105933493 A | 9/2016 |
| CN | 106603792 A | 4/2017 |
| CN | 106657537 A | 5/2017 |
| JP | 2006-174111 A | 6/2006 |
| JP | 2007-259275 A | 10/2007 |
| JP | 2012-222798 A | 11/2012 |
| JP | 2015-79237 A | 4/2015 |
| JP | 2015-115844 A | 6/2015 |
| WO | 2016/002406 A1 | 1/2016 |

* cited by examiner

| SURNAME | GIVEN NAME | NICKNAME | GENDER | FIRST TELEPHONE NUMBER | SECOND TELEPHONE NUMBER | THIRD TELEPHONE NUMBER | HOME ADDRESS | VOICEPRINT | HISTORY INFORMATION |
|---|---|---|---|---|---|---|---|---|---|
| Nissan | Ichiro | Grandfather | Male | ○○○○ | △△△△ | □□□□ | ×××  | ～ | 10/Year |
| Nissan | Hanako | Grandmother | Female | ○○○○ | △△△△ | □□□□ | ×××  | ～ | 10/Year |
| Nissan | Naoko | Mom | Female | ○○○○ | △△△△ | □□□□ | ×××  | ～ | 360/Year |
| Aoyama | Ichiro | Section Manager | Male | ○○○○ | △△△△ | □□□□ | ×××  | ～ | 60/Year |
| Okatsu | Jiro | Manager | Male | ○○○○ | △△△△ | □□□□ | ×××  | ～ | 120/Year |
| ... | ... | ... | ... | ... | ... | ... | ... | ... | ... |

FIG. 2

INFORMATION PROCESSING METHOD AND INFORMATION PROCESSING DEVICE

CROSS-REFERENCE TO RELATED APPLICATIONS

This application is a U.S. national stage application of International Application No. PCT/JP2018/004036, filed on Feb. 6, 2018.

BACKGROUND

Technical Field

The present invention relates to an information processing method and an information processing device.

Background Information

Conventionally, a technique has been disclosed in which a user's request is understood on the basis of text data pertaining to uttered speech uttered by the user, and a task that corresponds to the request is executed. For example, International Publication No. 2016/002406 discloses a voice command system.

SUMMARY

In the past, for example, registration information including the names (e.g., Hanako Nissan) and telephone numbers of family members or friends have been stored in advance in a database, and uttering something like "Call Hanako Nissan" to a speech input device makes it possible to search for the telephone number from "Hanako Nissan" and initiate a telephone call.

However, in everyday conversations, there are situations where family members, etc., are referred to by nicknames (e.g., mother) different from their names. As described above, it is typical for names (e.g., Hanako Nissan) to be registered in the registration information, and thus even when the phrase "Call Mom" is spoken, it is impossible to recognize that "Hanako Nissan" is "Mom," and no call can be initiated. Moreover, even if the registration information is stored, it is impossible to search for registration information from a nickname or to present the registration information to a speaker.

The present invention was contrived in view of the above problem, it being an object of the present invention to provide an information processing method and an information processing device with which it is possible to search a database for registration information on the basis of a nickname and present the registration information to a speaker.

An information processing method according to one embodiment of the present invention involves converting speech uttered by a speaker to text data and extracting a nickname from the text data. The method also involves searching a database for registration information that satisfies a condition corresponding to the nickname, and presenting the searched for registration information to the speaker.

According to the present invention, it is possible to search a database for registration information on the basis of a nickname and present the registration information to a speaker.

BRIEF DESCRIPTION OF THE DRAWINGS

FIG. 2 is a diagram showing one example of a configuration of a user database 2;

DETAILED DESCRIPTION OF EMBODIMENTS

Figure 1:
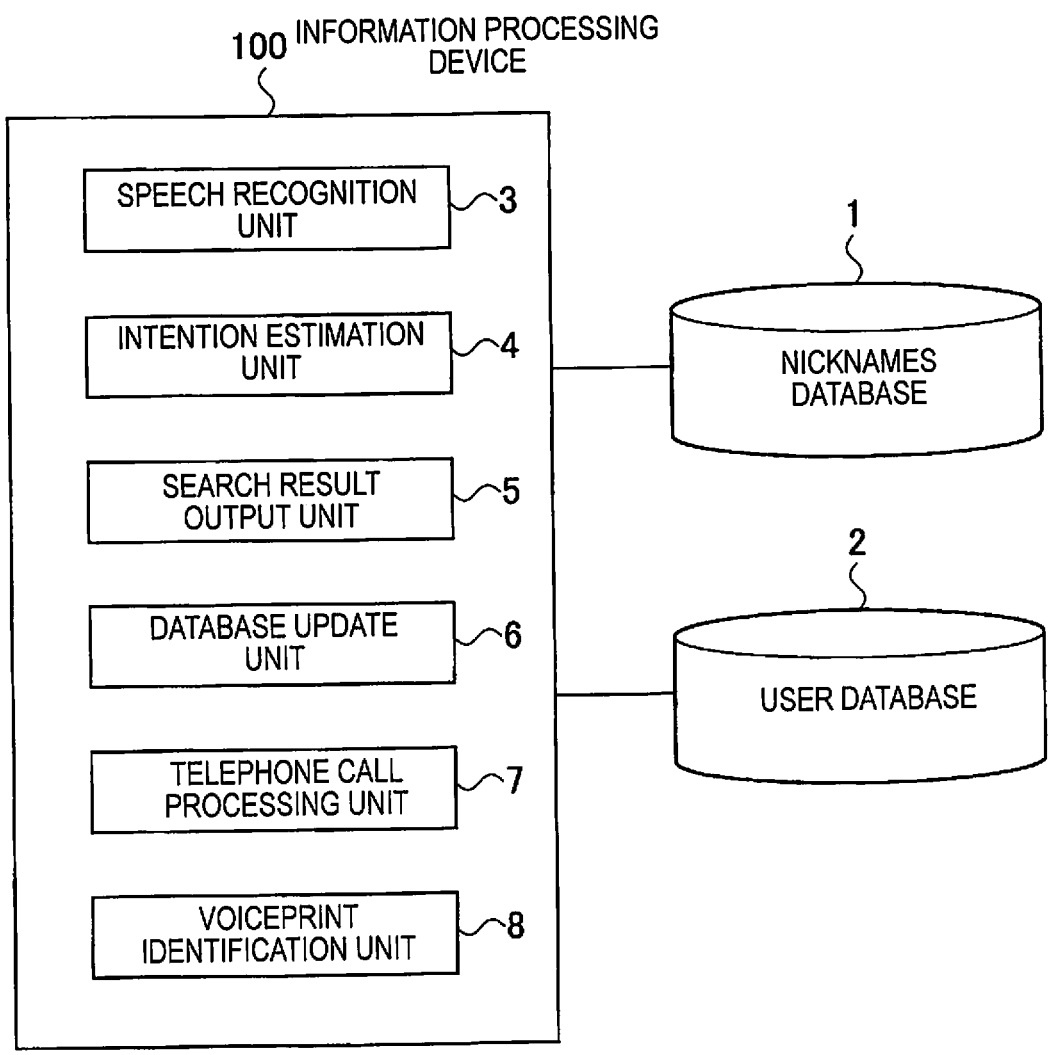
FIG. 1 is a block diagram showing a schematic configuration of an information processing device according to an embodiment.

An embodiment of the present invention is described with reference to the drawings. Identical portions indicated in the drawings are marked with identical reference symbols, and redundant descriptions are omitted.

An information processing device 100 according to the embodiment shown in FIG. 1 is mounted in a vehicle together with a nicknames database 1 and a user database 2. This vehicle is referred to as "given vehicle" below. The same function as is achieved with on-board databases can be fulfilled in cases where the nicknames database 1 and the user database 2 are provided outside of the vehicle and are externally accessed via an on-board communication device.

The information processing device 100 is provided with a speech recognition unit 3, an intention estimation unit 4, a search result output unit 5, a database update unit 6, a telephone call processing unit 7, and a voiceprint identification unit 8.

The information processing device 100 is a general-purpose microcomputer (also referred to as a "control unit") provided with a central processing device (CPU), a memory, and an input/output unit, the information processing device 100 executing an information processing method (described below). A computer program (information processing program) for causing the microcomputer to function as an information processing device is installed in the microcomputer. By executing the computer program, the microcomputer functions as a plurality of information processing circuits (3-8) provided to the information processing device. An example is illustrated in which the plurality of information processing circuits (3-8) provided to the information processing device are realized by software, but, as shall be apparent, it is also possible to prepare dedicated hardware for executing the information processes described below to configure the information processing circuits (3-8). The plurality of information processing circuits (3-8) may also be configured from individual hardware. Furthermore, the plurality of information processing circuits (3-8) may be used alongside an electronic control unit (ECU) used in other controls relevant to the vehicle.

Nicknames used in everyday conversation such as "Mom", "Father", "Grandmother" and "Grandfather" are registered in the nicknames database 1. Other nicknames such as "Section Manager" and "Manager" are used in the workplace, etc., and therefore such nicknames are also registered in the nickname database 1. As nicknames for referring to persons named "Ichiro," nicknames such as "Icchan" are also registered.

A user database 2 is provided for each passenger riding in the given vehicle. In the present example, a configuration is adopted in which there is only one passenger, i.e., the driver, and only a user database 2 of the driver is provided. A case where user databases 2 are provided for each of a plurality of passengers is described separately.

As shown in FIG. 2, the user database 2 is provided with registration information pertaining to each family member or friend of the driver (referred to as "relevant persons" below). The registration information is provided with the surnames and given names of the relevant persons, the nicknames for the relevant persons, the genders of the relevant persons, the home telephone numbers (referred to as the "first telephone number" in FIG. 2) of the relevant persons, the mobile telephone numbers (referred to as the "second telephone number" in FIG. 2) of the relevant persons, the work telephone numbers (referred to as the "third telephone number" in FIG. 2) of the relevant persons, the home addresses of the relevant persons, voiceprints for the voices of the relevant persons, and history information (e.g., information indicating, inter alia, frequency of calling). Registration information in which information is missing may also be included. For example, nicknames and voiceprints are not included in registration information pertaining to relevant persons for which no nicknames or voiceprints have been obtained.

The speech recognition unit 3 performs speech recognition of speech uttered by a driver and converts the recognized speech to text data. The intention estimation unit 4 extracts a nickname and a command from the text data. The command is, inter alia, a word that indicates a control desired by a speaker such as the driver. Specifically, the intention estimation unit 4 extracts, from the text data, a nickname that is identical to a nickname registered in the nicknames database 1. For the command as well, likewise, the intention estimation unit 4 extracts a command that is identical to a command registered in advance in a database (not shown).

The intention estimation unit 4 searches the user database 2 for registration information that satisfies conditions corresponding to the nickname. The search result output unit 5 presents a search result (registration information) obtained by the intention estimation unit 4 to the driver.

The database update unit 6 writes a nickname and/or a voiceprint detected by the voiceprint identification unit 8 into the registration information searched for by the intention estimation unit 4, and updates the history information. The database update unit 6 also creates new registration information in the user database 2.

In cases where the extracted command pertains to a telephone call, the telephone call processing unit 7 performs a control that corresponds to the command using the registration information searched for by the intention estimation unit 4. Specifically, the telephone call processing unit 7 initiates a telephone call, receives a telephone call, performs speech processing, etc. The telephone call processing unit 7 also detects a telephone number of the other party on a call. The voiceprint identification unit 8 detects a voiceprint from an utterance made during a telephone call.

Figure 3:
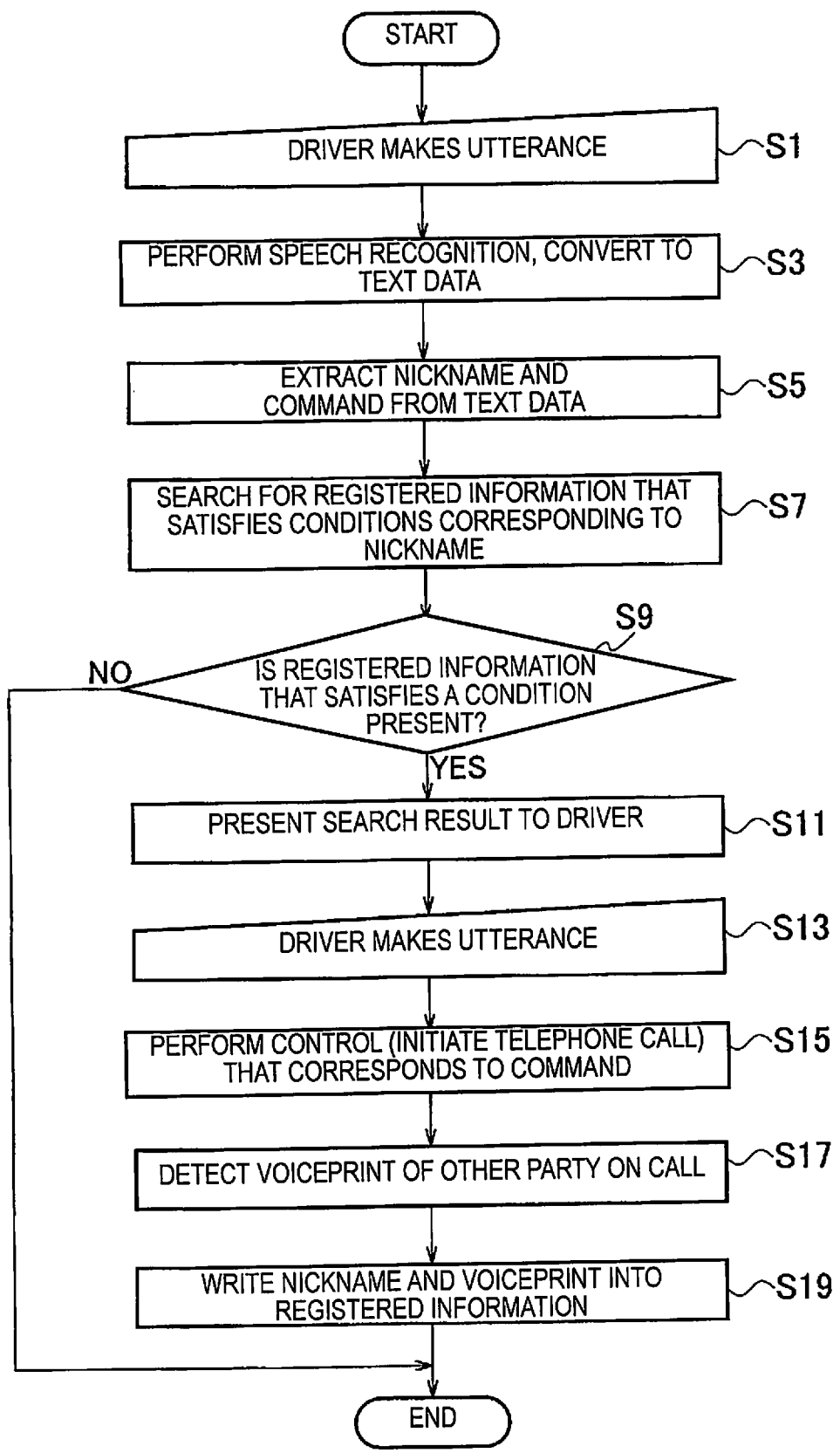
FIG. 3 is a flow chart showing an operation of the information processing device 100 when a driver in a given vehicle makes a telephone call.

FIG. 3 is a flow chart showing an operation of the information processing device 100 when the driver in the given vehicle makes a telephone call. For the information processing device 100, it is assumed that information pertaining to the surname, given name, gender, first to third telephone numbers, home address, and voiceprint of the driver is already known. This information is also assumed to be already known during the operations in FIGS. 4 and 5 (described below).

First, when the driver (speaker) utters something like "Call Mom" (S1), the speech recognition unit 3 acquires speech uttered by the driver from a speech input device (microphone; not shown). The speech then undergoes speech recognition and is converted to text data (S3). The term "call" is a command indicating a control desired by the driver (speaker).

The intention estimation unit 4 next breaks down the text data into words, and extracts a word that is identical to a nickname registered in the nicknames database 1, i.e., extracts a nickname (e.g., "Mom") (S5). The intention estimation unit 4 also extracts a word that is identical to a command registered in advance in a command database (not shown), i.e., extracts a command (e.g., "call") (S5).

The intention estimation unit 4 next searches the user database 2 for registration information that satisfies conditions corresponding to the nickname extracted in step S5 (S7). In cases where there is no registration information that satisfies the conditions (NO in S9), the process is ended. Specifically, a speech-initiated telephone call cannot be made, and, e.g., the driver inputs the telephone number of the other party, and the telephone call processing unit 7 initiates a telephone call, performs speech processing, etc. However, in cases where there is registration information that satisfies the conditions (YES in S9), the process advances to step S11.

Steps S7 and S9 are now described. The intention estimation unit 4 searches for registration information including the nickname extracted in step S5 (S7), and assesses whether such registration information is present (S9). In cases where such registration information is present (YES in S9), the intention estimation unit 4 reads out the registration information. In cases where only one item of registration information including the nickname is present in the user database 2, steps S11 and S13 (described below) are omitted.

Conditions such as "surname is the same, home address is the same, and gender is female" are associated in advance with the nickname "Mom" and are stored.

In cases where there is no registration information including this nickname, if the surname of the driver is "Nissan," the intention estimation unit 4 searches for registration information that, for example, includes the surname "Nissan," the same home address, and the gender "female" (registration information that satisfies conditions) (S7). An assessment is then made as to whether such registration information is present (S9). In cases where such registration information is present (YES in S9), the registration information (e.g., registration information including "Hanako" "Nissan") is read out.

Conditions such as "the third telephone number is the same" are associated in advance with the nickname "Section Manager" and are stored.

In cases where there is no registration information including this nickname, the intention estimation unit 4 searches for registration information (registration information that satisfies conditions) that includes a "third telephone number" that is the same as the "third telephone number" of the driver (S7). An assessment is then made as to whether such registration information is present (S9). In cases where such registration information is present (YES in S9), the registration information is read out.

In step S11, the search result output unit 5 presents a search result (registration information) obtained by the intention estimation unit 4 to the driver (S11). For example, the search result output unit 5 outputs the surname "Nissan"

and the given name "Hanako" found in the registration information in speech such as "Is 'Mom' 'Hanako' 'Nissan'?" (S11).

If the driver utters "yes" in response (S13), the speech recognition unit 3 performs speech recognition on the speech uttered by the driver and converts the recognized speech to text data, and the intention estimation unit 4 recognizes that the response was "affirmative." Specifically, it is recognized that the registration information including "Hanako" and "Nissan" was specified.

Cases where a plurality of items of registration information have been searched for in step S7 are now described. For example, in a case where registration information including the surname "Nissan" and the given name "Hanako," and registration information including the surname "Nissan" and the given name "Naoko," have both been searched for, the search result output unit 5 uses the nickname "Mom" extracted in step S5 to output speech such as "Is 'Mom' 'Hanako' 'Nissan,' or 'Naoko' 'Nissan'?" (S11).

If the driver utters "'Hanako' 'Nissad'" in response (S13), the speech recognition unit performs speech recognition on the speech uttered by the driver and converts the recognized speech to text data, and the intention estimation unit 4 recognizes that the response was "'Hanako' 'Nissan.'" Specifically, it is recognized that the registration information including "Hanako" and "Nissan" was specified. The registration information can be said to be registration information that is selected by the driver (speaker) through an utterance.

When one item of registration information is specified in the manner described above, the telephone call processing unit 7 uses the specified registration information to perform a control that corresponds to the command (S15). In step S15, for example, a call is initiated to any telephone number in the registration information, and speech processing is performed during the telephone call.

The voiceprint identification unit 8 detects the voiceprint of the other party on the call from utterances made during the telephone call in step S15 (S17).

The database update unit 6 next writes the nickname extracted in step S15 and the voiceprint detected in step S17 into the specified registration information (S19). The history information is then updated and the process is ended.

As described above, according to the flow chart shown in FIG. 3, speech uttered by the speaker (driver) is converted to text data (S3), and a nickname (Mom, Section Manager) is extracted from the text data (S5). Registration information that satisfies conditions corresponding to the nickname (Mom, Section Manager) is searched for from the database (2) (S7). This makes it possible to search the database (2) for registration information on the basis of the nickname and to present the registration information to the speaker.

By having the nickname be written into the searched for registration information (S19), subsequent searches of the registration information are preferably made for registration information including the nickname, obviating the need to search for the registration information via conditions corresponding to the nickname.

The command indicating the control desired by the speaker (driver) is also extracted from the text data (S5), and the registration information searched for in step S7 is used to perform a control (initiate a telephone call) that corresponds to the command (S15). Thus, uttering a nickname and a command makes it possible to perform a control that corresponds to the command.

In addition, a plurality of items of the searched for registration information (Hanako Nissan, Naoko Nissan) are presented to the speaker (driver) (S11), and the nickname is written into the registration information selected by the speaker (S19).

Thus, subsequent searches of the registration information are preferably made for registration information including the nickname, obviating the need to search for the registration information via conditions corresponding to the nickname.

Figure 4:
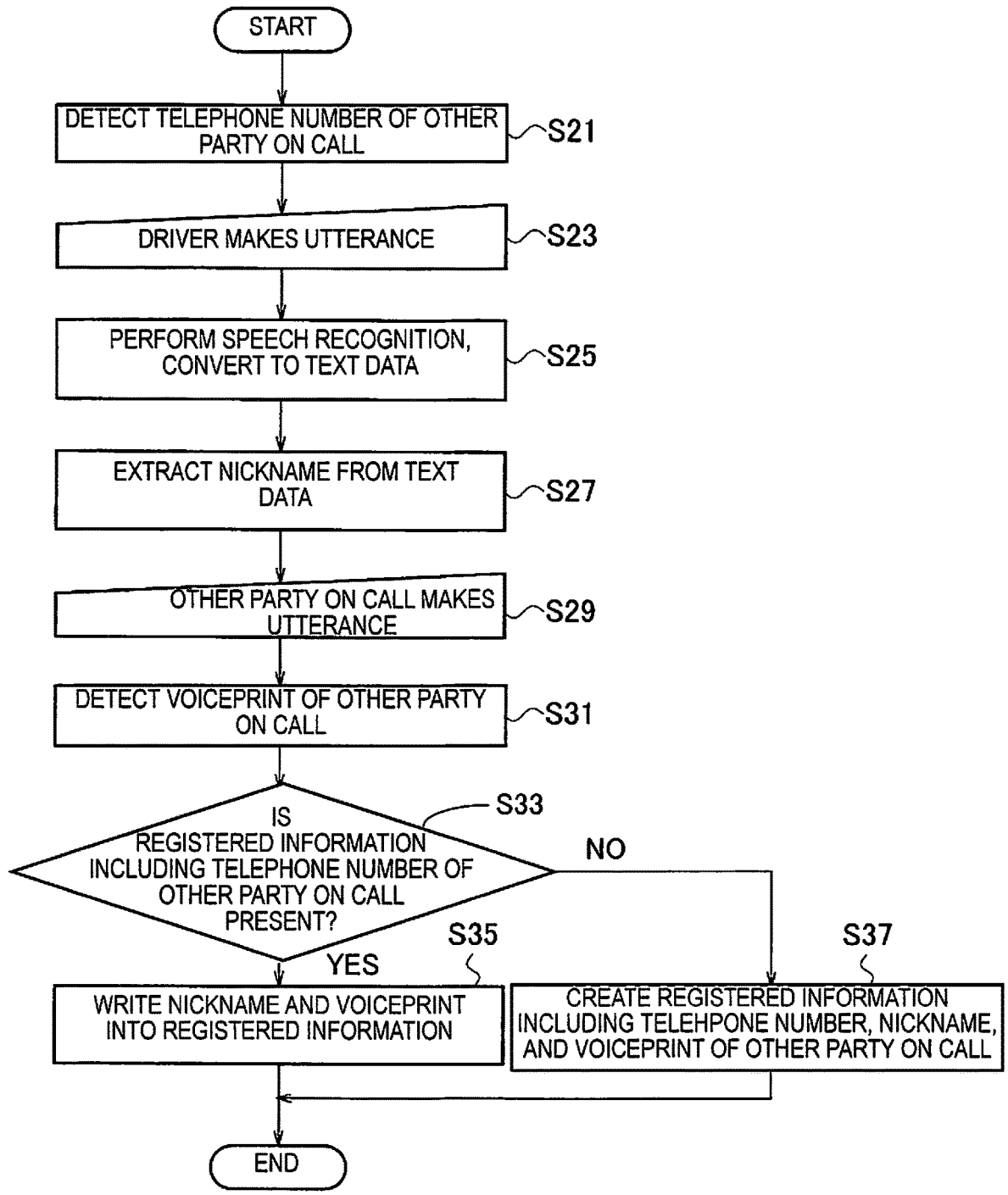
FIG. 4 is a flow chart showing an operation of the information processing device 100 during a telephone call after the driver has inputted a telephone number to initiate a telephone call.

FIG. 4 is a flow chart showing an operation of the information processing device 100 during a telephone call after the driver, unable make a speech-initiated telephone call, has inputted a telephone number to initiate a telephone call.

First, the telephone call processing unit 7 detects the telephone number of the other party on the call (person being referred to by the driver using the nickname) (S21). If, during the telephone call, the driver utters something like "Mom, are you free next Sunday?" or "Icchan, are you free next Sunday?" (S23), the speech recognition unit 3 performs speech recognition on the speech uttered by the driver and converts the recognized speech to text data (S25).

The intention estimation unit 4 next breaks down the text data into words, and extracts a word that is identical to a nickname registered in the nicknames database 1, i.e., extracts the nickname "Mom" or "Icchan" (S27).

If the other party on the call (person being referred to) utters something like "Sure, what'd you have in mind?" (S29), the voiceprint identification unit 8 detects the voiceprint of the other party on the call from the uttered speech (S31).

The intention estimation unit 4 next refers to the user database 2 and assesses whether registration information including the telephone number of the other party on the call detected in step S21 is present in the user database 2 (S33). Specifically, registration information including the telephone number of the other party on the call is searched for from the user database 2.

In cases where such registration information is present (YES in S33), the database update unit 6 writes the nickname extracted in step S27 and the voiceprint detected in step S31 into the registration information (S35), and then the process is ended.

In step S35, for example, the voiceprint of "Hanako" "Nissan" and the nickname "Mom" are written into registration information pertaining to "Hanako" "Nissan," who was referred to using the nickname "Mom."

However, in cases where such registration information is not present (NO in S33), the database update unit 6 newly creates, in the user database 2, registration information including the telephone number detected in step S21 (telephone number of other party on the call), the nickname extracted in step S27 (nickname for other party on the call), and the voiceprint detected in step S31 (voiceprint of other party on the call) (S37), and then the process is ended.

In step S37, for example, registration information including the nickname "Icchan," a telephone number, and a voiceprint is created in the user database 2. Other information (surname, given name, etc.) pertaining to the registration information can be subsequently added through an input operation, etc.

Through the process in FIG. 4, the voiceprint of "Hanako" "Nissan" and the nickname "Mom" used when the driver refers to "Hanako" "Nissan" can be written into registration information pertaining to "Hanako" "Nissan" within the user database 2.

In addition, registration information including a telephone number and a voiceprint of a person referred to by the driver using the nickname "Icchan," as well as the nickname "Icchan," can be created in the user database 2.

As described above, according to the flow chart shown in FIG. 4, speech uttered by the speaker (driver) during a telephone call with a person being referred to using a nickname (other party on the call) is converted to text data (S25), the nickname (Mom, Icchan) is extracted from the text data (S27), the telephone number of the person being referred to (other party on the call) is detected (S21), and registration information including the telephone number is searched for from the database (2) (S33).

In cases where the searched for registration information including the telephone number is present in the database (2) (YES in S33), the nickname (Mom) is written into the registration information including the telephone number (S35).

Thus, subsequent searches of the registration information are preferably made for registration information including the nickname, obviating the need to search for the registration information via conditions corresponding to the nickname.

In cases where the searched for registration information including the telephone number is not present in the database (NO in S33), registration information including the telephone number and the nickname (Icchan) is created in the database (2) (S37).

Thus, subsequent searches of the registration information are preferably made for registration information including the nickname, obviating the need to search for the registration information via conditions corresponding to the nickname.

Figure 5:
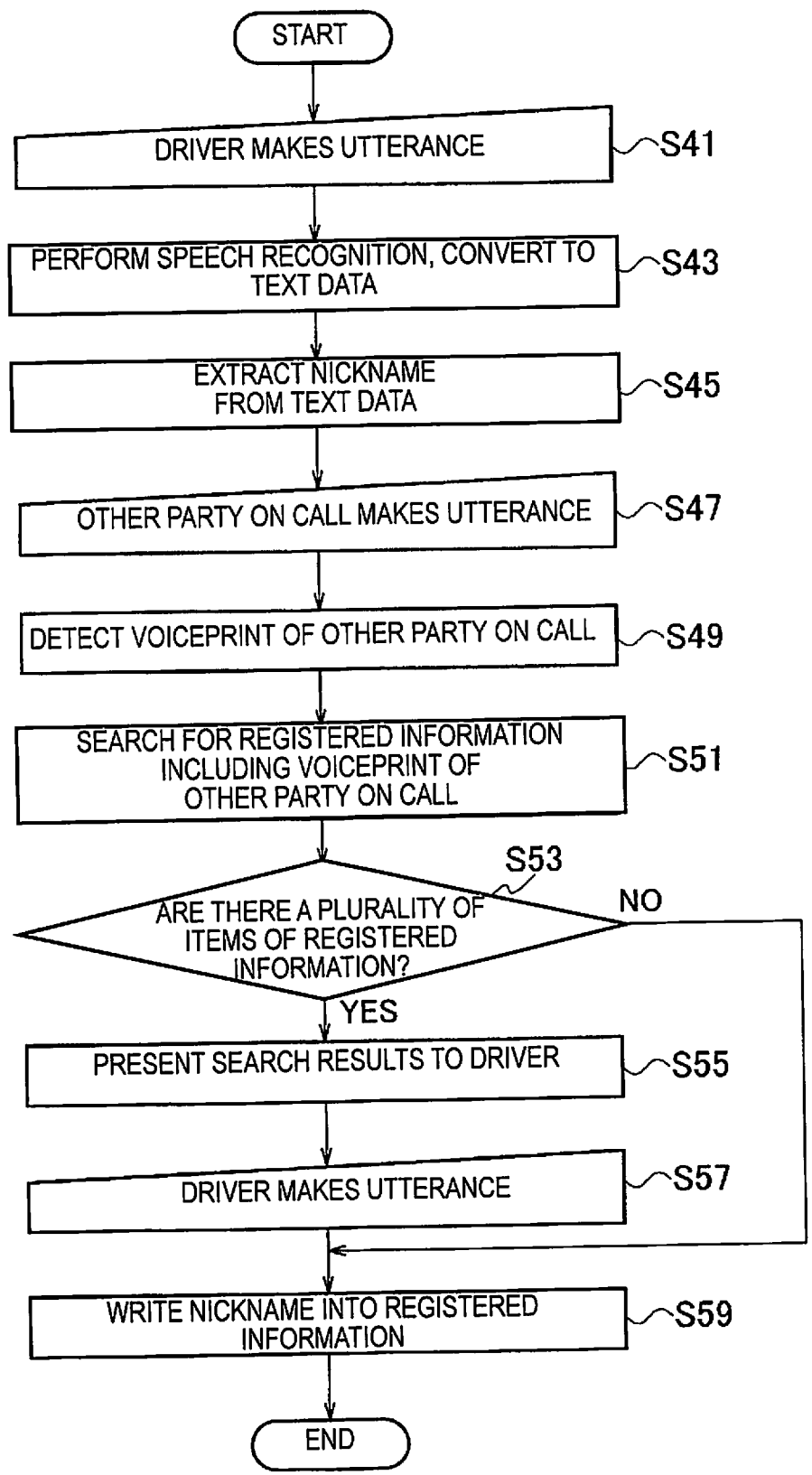
FIG. 5 is a flow chart showing another operation of the information processing device 100 during a telephone call initiated under the same conditions as in FIG. 4.

FIG. 5 is a flow chart showing another operation of the information processing device 100 during a telephone call initiated under the same conditions as in FIG. 4. In this instance, an operation that obviates the need for step S21 (detection of telephone number) in FIG. 4 is described.

First, if the driver (speaker) utters something like "Mom, are you free next Sunday?" (S41), the speech recognition unit 3 performs speech recognition on the speech uttered by the driver and converts the recognized speech to text data (S43).

The intention estimation unit 4 next breaks down the text data into words, and extracts a word that is identical to a nickname registered in the nicknames database 1, i.e., extracts the nickname "Mom" (S45).

If the other party on the call (person in dialogue with the speaker) utters something like "Sure, what'd you have in mind?" (S47), the voiceprint identification unit 8 detects a voiceprint of the other party on the call from the uttered speech (S49).

The intention estimation unit 4 next searches the user database 2 for registration information including the voiceprint detected in step S49 (S51).

In cases where there are a plurality of items of registration information including the voiceprint detected in step S49 (YES in S53), the search result output unit 5 presents the search results obtained by the intention estimation unit 4 to the driver (S55).

For example, in a case where the voiceprint of "Hanako" "Nissan" and the voiceprint of "Naoko" "Nissan" are similar, registration information including the surname "Nissan" and the given name "Hanako" and registration information including the surname "Nissan" and the given name "Naoko" may both be searched for, depending on the precision of voiceprint detection. Specifically, a plurality of items of registration information may be searched for.

In such cases, the search result output unit 5 uses the nickname "Mom" extracted in step S27 to output speech such as "Is 'Mom' 'Hanako' 'Nissan,' or 'Naoko' 'Nissan'?" (S55). Specifically, the plurality of items of registration information are presented to the speaker (driver).

If the driver utters "'Hanako' 'Nissan'" in response (S57), the speech recognition unit 3 performs speech recognition on the speech uttered by the driver and converts the recognized speech to text data, and the intention estimation unit 4 recognizes that the response was "'Hanako' 'Nissan.'"

Specifically, it is recognized that registration information including "Hanako" "Nissan" was specified. In cases where one item of registration information including the voiceprint detected in step S31 is present (NO in S53), it is recognized that the one item of registration information was specified.

When one item of registration information is specified in this manner, the database update unit 6 writes the nickname extracted in step S45 into the specified registration information (S59). The history information is then updated and the process is ended.

Through the process in FIG. 5, the nickname "Mom" used when the driver refers to "Hanako" "Nissan" can be written into registration information pertaining to "Hanako" "Nissan" within the user database 2.

In addition, in a case where "Ichiro" "Aoyama," who is referred by the driver using the nickname "Section Manager," is the other party on the call, the nickname "Section Manager" can be written into the registration information for "Ichiro" "Aoyama" in the user database 2.

Moreover, if an information processing device 100 is also mounted in a vehicle in which the other party on the call, "Ichiro" "Aoyama", is riding, the nickname used when "Ichiro" "Aoyama" refers to the driver "Taro" "Nissan," e.g., "Nissan-kun," can be written into registration information for "Taro" "Nissan" in the vehicle in which "Ichiro" "Aoyama" is riding.

As described above, according to the flow chart shown in FIG. 5, speech uttered by the speaker (driver) as part of a dialogue with a person being referred to using a nickname (other party on the call) is converted to text data (S43), the nickname (Mom) is extracted from the text data (S45), and a voiceprint is detected from speech uttered by the person being referred to (other party on the call) as part of a dialogue with the speaker (S49). Registration information including the voiceprint is then searched for from a database (2) (S51), and the nickname is written into the searched for registration information (S59).

Thus, subsequent searches of the registration information are preferably made for registration information including the nickname, obviating the need to search for the registration information via conditions corresponding to the nickname.

In addition, a plurality of the searched for registration information (Hanako Nissan, Naoko Nissan) is presented to the speaker (driver) (S55), and the nickname is written into the registration information selected by the speaker (S59).

Thus, subsequent searches of the registration information are preferably made for registration information including the nickname, obviating the need to search for the registration information via conditions corresponding to the nickname.

Figure 6:
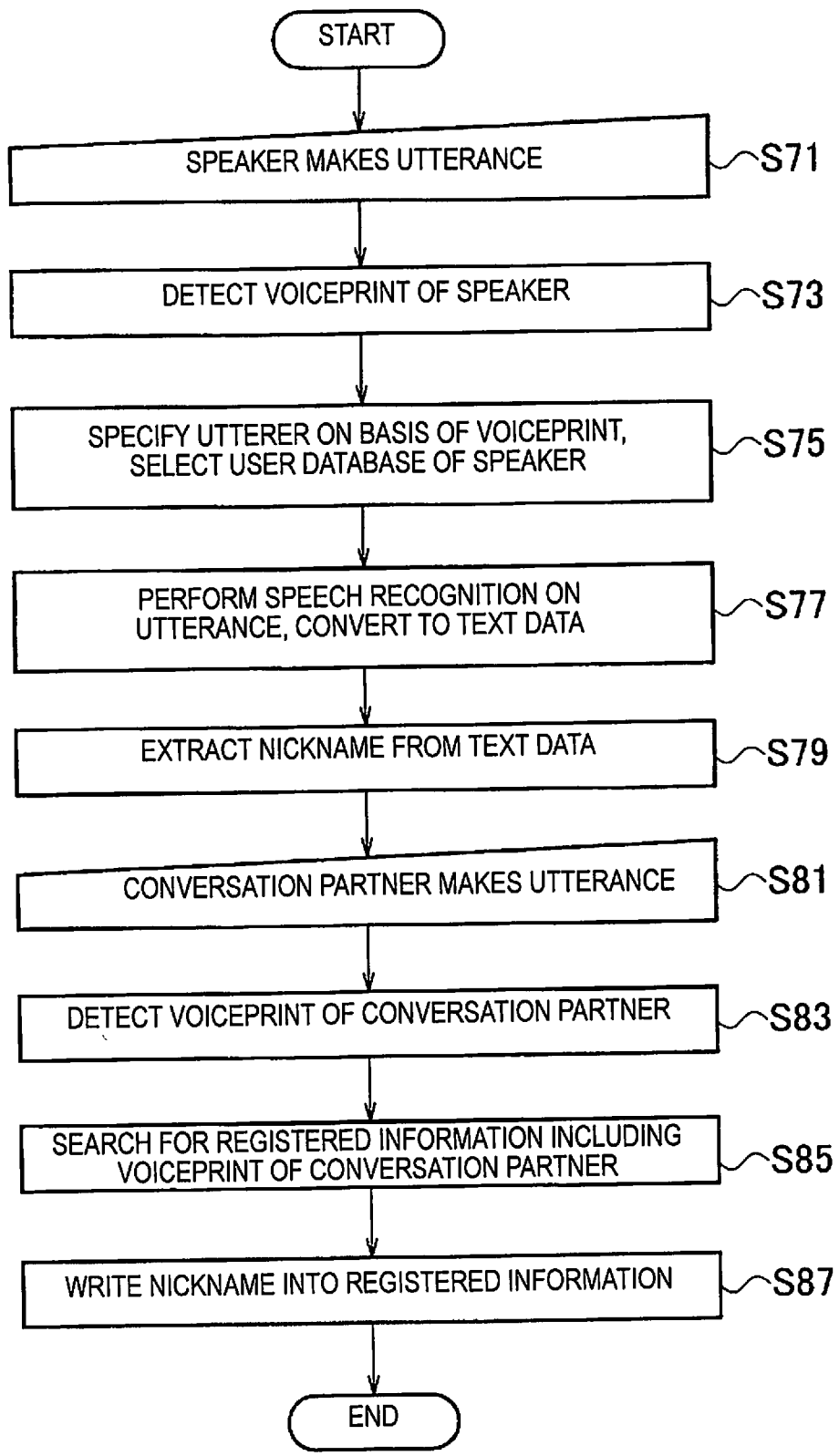
FIG. 6 is a flow chart showing an operation of the information processing device 100 when the driver and a fellow passenger inside the given vehicle are conversing.

FIG. 6 is a flow chart showing an operation of the information processing device 100 when the driver inside the given vehicle and a fellow passenger are conversing. In this instance, the driver is referred to as "driver A," and the fellow passenger is referred to as "fellow passenger B."

User databases 2 are provided for the driver A and the fellow passenger B, i.e., for each of a plurality of passengers.

Depending on the information processing device 100, it is assumed that information pertaining to the surname, given name, gender, first to third telephone numbers, home address, and voiceprint of the driver A and the fellow passenger B is already known.

First, if either the driver A or the fellow passenger B (i.e., the speaker) utters something like "Mom, are you free next Sunday?" (S71), the voiceprint identification unit 8 detects the voiceprint of the speaker from the uttered speech (S73).

The intention estimation unit 4 next specifies whether the speaker is the driver A or the fellow passenger B on the basis of the voiceprint detected in step S73, and selects the user database 2 of the specified speaker as a subject of processing (S75).

For example, storing the voiceprint of the driver A in advance in the user database 2 of the driver A, storing the voiceprint of the fellow passenger B in advance in the user database 2 of the fellow passenger B, and making a comparison with the detected voiceprint makes it possible to specify the speaker.

In addition, the speech recognition unit 3 performs speech recognition on the speech uttered in step S71 and converts the recognized speech to text data (S77).

The intention estimation unit 4 next breaks down the text data into words, and extracts a word that is identical to a nickname registered in the nicknames database 1, i.e., extracts the nickname "Mom" (S79).

If the conversation partner utters something like "Sure, what'd you have in mind?" (S81), the voiceprint identification unit 8 detects the voiceprint of the conversation partner from the uttered speech (S83).

The intention estimation unit 4 next searches the user database 2 selected in step S75 for registration information including the voiceprint detected in step S83 (S85). In cases where a plurality of items of registration information including the detected voiceprint are present, the search results are presented as in FIG. 5, and a single item of registration information is to be specified on the basis of the uttered response.

The database update unit 6 then writes the nickname extracted in step S79 into the specified registration information (S87). The history information is then updated and the process is ended.

Through the process in FIG. 6, the nickname "Mom" used when the driver A refers to the fellow passenger B can be written into registration information pertaining to the fellow passenger B within the user database 2 of the driver A. In addition, by repeated performance of the process in FIG. 6, the nickname "Dad" used when the fellow passenger B refers to the driver A can be written, at a separate timing, into the registration information pertaining to the driver A within the user database 2 of the fellow passenger B.

In Japan, in cases where the driver A and the fellow passenger B are a married couple, they may refer to each other as "Mom" and "Dad" in this manner.

A similar process may be carried out in regard to a conversation between the fellow passenger B and another fellow passenger (referred to as "fellow passenger C"). In cases where the fellow passenger C is the grandchild of the fellow passenger B, it is considered that the fellow passenger C will refer to the fellow passenger B using the nickname "Grandma". In these cases, the nickname "Grandma" is written into registration information pertaining to the fellow passenger B within the user database 2 of the fellow passenger C (grandchild).

Specifically, the nickname "Mom" written into the registration information pertaining to the fellow passenger B within the user database 2 of the driver A (husband) and the nickname "Grandma" written into the registration information pertaining to the fellow passenger B within the user database 2 of the fellow passenger C (grandchild) are different despite both being nickname used when referring to the same fellow passenger B.

This makes it possible to initiate a telephone call to the fellow passenger B due to the driver A (husband) uttering "Call Mom," and also to initiate a telephone call to the fellow passenger B due to the fellow passenger C (grandchild) uttering "Call Grandma." Specifically, it is possible to initiate a telephone call to the fellow passenger B using each of the nicknames.

As described above, according to the flow chart in FIG. 6, the speech uttered by the speaker as part of a dialogue with the person being referred to using the nickname is converted to text data (S77), the nickname (Mom) is extracted from the text data (S79), and a voiceprint is detected from speech uttered by the person being referred to (conversation partner) as part of a dialogue with the speaker (S83). Registration information in which the voiceprint is registered is searched for from a database (2) (S85), and the nickname is written into the searched for registration information (S87).

Thus, subsequent searches of the registration information are preferably made for registration information including the nickname, obviating the need to search for the registration information via conditions corresponding to the nickname.

One embodiment was described above, but it is possible to realize various modifications by performing similar processes.

For example, the information processing device 100 may be mounted in a ridden form of transport such as a motorcycle or a bicycle rather than a (four-wheeled) vehicle, or may be incorporated into a telephone (landline telephone or mobile telephone). In such instances, the telephone call processing unit 7 is to assume the functions of a telephone.

The information processing device 100 may also be installed in a conference room, etc., and the process shown in FIG. 6 can be performed.

The information processing device 100 may also be mounted in a communication-capable computer that is connected to the Internet, etc., and the text data may be acquired from email and/or dialogue application software. In this instance, an email address or user ID is to be used instead of a telephone number. Moreover, exchange of emails and/or dialogues in the dialogue application software may be performed instead of telephone conversations.

As described above, although one embodiment of the present invention was described, the statements and drawings that form a part of this disclosure are not to be understood as limiting the invention. Various substitute embodiments, examples, and operation techniques will be obvious to persons skilled in the art from these disclosures.

The functions indicated in the embodiments described above can be realized through one or a plurality of processing circuits. The processing circuits include programmed processing devices, such as processing devices that include electrical circuits. The processing devices also include devices such as application-specific integrated circuits (ASICs) and conventional circuit components arranged so as to execute the functions described in the embodiments.

The invention claimed is:

1. A method for processing information in an information processing device that searches a database for registration information, the information processing method comprising:
converting speech uttered by a speaker to text data;
extracting a nickname from the text data;
searching in the database to determine whether the nickname is associated with registration information;
upon determining that the nickname is not associated with registration information stored in the database, searching in the database for registration information that satisfies a match condition;
presenting to the speaker the registration information that satisfies the match condition, and
writing the nickname into the registration information that satisfies the match condition if the speaker indicates that the registration information that satisfies the match condition corresponds to the nickname.

2. The information processing method according to claim 1, wherein
the nickname indicates a personal name, and the match condition includes at least one selected from the group consisting of: a same surname as a surname of the speaker, a gender that is associated in advanced with the nickname, a same home address as a home address of the speaker, and a same telephone number as a telephone number of the speaker.

3. The information processing method according to claim 1, wherein
the nickname, and a given name of a person included in the searched for registration information that satisfies the match condition, are associated with each other and presented to the speaker.

4. The information processing method according to claim 1, wherein
the nickname, and a given name of a person included in the searched for registration information that satisfies the match condition, are associated with each other and presented to the speaker; and
the nickname is recorded in association with the registration information that satisfies the match condition upon determining an affirmative response from the speaker.

5. The information processing method according to claim 1, further comprising
extracting from the text data a command that indicates a control desired by the speaker, and
using the registration information that satisfies the match condition to perform a control that corresponds to the command.

6. The information processing method according to claim 1, wherein
the converting of the speech uttered by the speaker to the text data is performed during a telephone call with a person being referred to using the nickname, and further comprising
detecting a telephone number of the person being referred to during the telephone call with the speaker;
searching in the database for the registration information including the telephone number; and
writing the nickname into the registration information including the telephone number upon determining the registration information including the telephone number that was searched for is present in the database.

7. The information processing device processing method according to claim 6, further comprising
creating in the database registration information including the telephone number and the nickname upon determining the registration information including the telephone number that was searched for is not present in the database.

8. The information processing method according to claim 1, wherein
the converting of the speech uttered by the speaker to the text data is performed during a dialogue with the person being referred to using the nickname, and further comprising
detecting a voiceprint from the speech uttered by the person during the dialogue with the speaker;
searching in the database for the registration information including the voiceprint; and
writing the nickname into the registration information including the voiceprint upon determining the registration information including the voiceprint that was searched for is present in the database.

9. The information processing method according to claim 1, wherein
the presenting of the registration information that satisfies the match condition to the speaker includes presenting a plurality of items that satisfy the match condition, and further comprising
writing the nickname in the registration information that was selected by the speaker from among the plurality of items that satisfy the match condition.

10. An information processing device comprising:
a database that stores registration information;
a speech recognition unit that converts speech uttered by a speaker to text data;
an intention estimation unit that extracts a nickname from the text data, searches the database to determine whether the nickname is associated with registration information, and, upon determining that the nickname is not associated with registration information stored in the database, searches the database for registration information that satisfies a match condition;
a search result output unit that presents to the speaker the registration information that satisfies the match condition, and
a database update unit that writes the nickname into the registration information that satisfies the match condition if the speaker indicates that the registration information that satisfies the match condition corresponds to the nickname.

* * * * *